United States Patent Office 3,454,578
Patented July 8, 1969

3,454,578
CYCLOALK[c]ISOQUINOLINES
James W. Wilson, Wayne, Pa., assignor to Smith Kline & French Laboratories, Philadelphia, Pa., a corporation of Pennsylvania
No Drawing. Filed Mar. 8, 1967, Ser. No. 621,452
Int. Cl. C07d 35/22
U.S. Cl. 260—286       5 Claims

ABSTRACT OF THE DISCLOSURE

Cycloalk[c]isoquinolines which are prepared from cis-N-(2-phenylcycloalkyl)formamides have antidepressant, analgesic and antipyretic activity.

---

This invention relates to new cycloalk[c]isoquinolines having pharmacodynamic activity, in particular having antidepressant, analgesic and antipyretic activity.

The new compounds of this invention are represented by the following structural formulas:

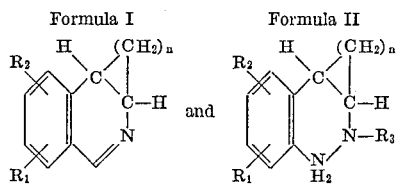

in which:
$R_1$ is hydrogen, halogen, lower alkyl, lower alkoxy or trifluoromethyl;
$R_2$ is hydrogen or, together with $R_1$, methylenedioxy, dihalogen, di-lower alkyl or di-lower alkoxy;
$R_3$ is hydrogen or lower alkyl and
$n$ is an integer of from 1 to 3 inclusive.

Advantageous compounds of this invention are represented by Formula I above when $R_1$ is hydrogen, chloro or trifluoromethyl, $R_2$ is hydrogen and $n$ is 1 and by Formula II above when $R_1$ is hydrogen, chloro or trifluoromethyl, $R_2$ and $R_3$ are hydrogen and $n$ is 1.

A preferred compound of this invention is 1a,7b-dihydro-1H-cycloprop[c]isoquinoline which is represented by Formula I when $R_1$ and $R_2$ are hydrogen and $n$ is 1.

The terms "lower alkyl" and "lower alkoxy" where used herein denote groups having from 1–4, preferably 1–2, carbon atoms.

This invention also includes pharmaceutically acceptable salts of the above defined bases formed with non-tobic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic lactic, malic, mandelic, cinnamic, citraconic, aspartic, stearic, palmitic, itaconic, glycolic, p-aminobenzoic, glutamic benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The cycloalk[c]isoquinolines of this invention are prepared by the following procedure:

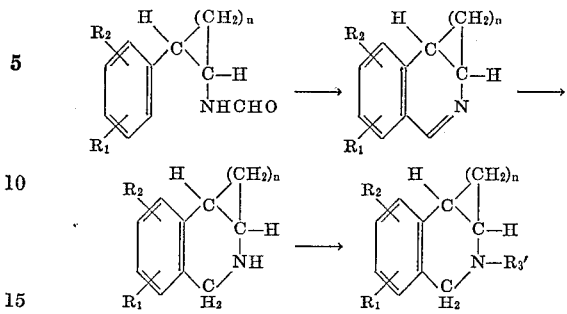

The terms $R_1$, $R_2$ and $n$ are as defined above and $R_3'$ is lower alkyl.

According to the above procedure a cis-N-(2-phenylcycloalkyl)formamide is cyclized by treating with a dehydrating agent such as phosphorus pentoxide in an inert solvent such as an aromatic hydrocarbon, for example toluene or xylene, to give the compounds of this invention represented by Formula I. The reaction is preferably carried out at elevated temperature, conveniently, at reflux temperature.

The cycloalk[c]isoquinolines of Formula I are reduced with a reducing agent such as a bimetallic hydride, preferably sodium borohydride in methanol, to give the compounds of this invention represented by Formula II when $R_3$ is hydrogen. Alkylation of the nitrogen atom of these compounds to give further compounds of this invention is carried out by known procedures, such as by acylating with a lower alkanoyl halide or a lower alkanoic acid anhydride and reducing, for example with a bimetallic hydride such as lithium aluminum hydride or diborane.

The cis-N-(2-phenylcycloalkyl)formamide starting materials are either known to the art or are prepared by known methods (Kaiser et al., U.S. Patent No. 3,207,785). Briefly, the formamide starting materials are prepared by reacting a cis-2-phenylcycloalkylamine with an excess of ethyl formate at elevated temperature preferably at the reflux temperature of the mixture or alternatively with an excess of acetic formic anhydride. Removal of the excess ethyl formate or acetic formic anhydride and purification of the residue by recrystalization from a suitable solvent such as toluene, petroleum ether or hexane gives the formamide.

The cis-2-phenylcycloalkylamines are either known to the art or are prepared by known methods, for example, as described in Kaiser et al., U.S. Patent No. 3,207,785 for cis-2-phenylcyclopropylamines, Beard et al., J. Org. Chem. 26:2335–2339 (1961) for cis-2-phenylcyclobutylamines and Govindachari et al., J. Chem. Soc. 4280–4283 (1956) for cis-2-phenylcyclopentylamines.

The following examples are not limiting but are illustrative of compounds of this invention and procedures for their preparation.

EXAMPLE 1

To 550 ml. of tetrachloroethane is added 55 g. of cis-N-(2-phenylcyclopropyl)formamide. To this mixture, under nitrogen, is added 55 g. of phosphorus pentoxide and the resulting suspension is heated to 100° C. over 20 minutes and then stirred at 100° C. for three hours. During the stirring three 30 g. portions of phosphorus pentoxide are added at equal intervals after the first hour. The resulting suspension is cooled and added to about 3 l. of ice-water with stirring. The water layer is separated, washed with ether and then neutralized while cold with 40% sodium hydroxide solution. The resulting mixture is extracted with ether. The extract is washed with water, dried over magnesium sulfate, cooled, filtered and the ether is removed from the filtrate to give, as the residue, 1a,7b-dihydro-1H-cycloprop[c]isoquinoline.

Hydrogen chloride is bubbled into an ether solution of 1a,7b-dihydro-1H-cycloprop[c]isoquinoline until the solution is acidic. The suspension is then heated for about two minutes. The ether is decanted and the residue is washed with ether then dissolved in about 30 ml. of isopropanol. The solution is refluxed, then chilled and filtered to give 1a,7b-dihydro-1H-cycloprop[c]isoquinoline hydrochloride.

EXAMPLE 2

Twenty grams of 1a,7b-dihydro-1H-cycloprop[c]isoquinoline hydrochloride, prepared as in Example 1, is dissolved in 550 ml. of methanol. The solution is chilled to 2° C. and then over a period of about seven minutes 16.5 g. of sodium borohydride is added. The solution is raised to 35° C., stirred for 30 minutes, then chilled and treated with 275 ml. of water. The methanol is removed in vacuo and 500 ml. of water is added. The solution is treated with 75 ml. of 5% sodium hydroxide solution. The mixture is then extracted with ether. The ether extract is dried over magnesium sulfate, filtered and the ether is removed in vacuo from the filtrate to give 1a,2,3,7b-tetrahydro-1H-cycloprop[c]isoquinoline.

An ether solution of the above prepared base is acidified with gaseous hydrogen chloride to give, after filtering and recrystallizing from ethanol-ether, 1a,2,3,7-tetrahydro-1H-cycloprop[c]isoquinoline hydrochloride.

EXAMPLE 3

4-trifluoromethylstyrene (30.0 g.) and 35.0 g. of ethyl diazoacetate are mixed at 0° C. and the mixture gradually heated to 150° C. The reaction is maintained at this temperature for three hours and then the mixture is distilled under reduced pressure. The main fraction is collected which consists of ethyl 2-(4-trifluoromethylphenyl)cyclopropanecarboxylate.

A solution of 11.5 g. of potassium hydroxide in 12 ml. of water and 50 ml. of 95% ethanol is added to 17.6 g. of ethyl 2-(4-trifluoromethylphenyl)cyclopropanecarboxylate. The solution is refluxed for eight hours, then concentrated, acidified with hydrochloric acid and filtered to give after fractional recrystallization the separated isomeric cis-2-(4-trifluoromethylphenyl)cyclopropanecarboxylic acid.

To 11.5 g. of cis-2-(4-trifluoromethylphenyl)cyclopropanecarboxylic acid in 70 ml. of acetone and 14 ml. of water at 0° C. is added slowly 7.6 g. of triethylamine in 25 ml. of acetone, then 16.4 g. of ethyl chloroformate in 25 ml. of acetone. The resulting mixture is stirred for 30 minutes at 0° C. Sodium azide (6.5 g.) in 23 ml. of water is added dropwise. The resulting mixture is stirred for 30 minutes, then poured into an excess of ice-water. Extracting with ether, then drying and concentrating the extracts, adding 200 ml. of toluene, then heating cautiously until nitrogen evolution is completed, concentrating, adding 7 N hydrochloric acid, refluxing with stirring until gas evolution ceases, concentrating in vacuo, dissolving the residue in water, extracting with ether, making the aqueous solution alkaline with 2 N sodium hydroxide solution, then extracting the basic solution with ether, drying the extract of the basic solution and removing the ether therefrom in vacuo gives cis-2-(4-trifluoromethyl)cyclopropylamine.

A mixture of 20.0 g. of cis-2-(4-trifluoromethyl)cyclopropylamine and 150 ml. of acetic formic anhydride is heated at 40° C. for 17 hours, then evaporated in vacuo to give, as the residue, cis-N-[2-(4-trifluoromethylphenyl)cyclopropyl]formamide.

Heating 10 g. of cis-N-[2-(4-trifluoromethylphenyl)cyclopropyl]formamide with 30 g. of phosphorus pentoxide in 110 ml. of tetrachloroethane at 100° C. for 3.5 hours with stirring, under nitrogen, and working up as in Example 1 gives 1a,7b-dihydro-5-trifluoromethyl-1H-cycloprop[c]isoquinoline.

The above prepared base is dissolved in ether and hydrogen chloride is bubbled into the solution to give, after heating for five minutes on a steam bath, then cooling and filtering, 1a,7b-dihydro-5-trifluoromethyl-1H-cycloprop[c]isoquinoline hydrochloride.

Treating the above prepared hydrochloride salt in ethanol with sodium borohydride by the procedure of Example 2 gives 1a,2,3,7-tetrahydro-5-trifluoromethyl-1H-cycloprop[c]isoquinoline.

An ether solution of the above prepared base is treated with glacial acetic acid to give, after filtering, 1a,2,3,7-tetrahydro-5-trifluoromethyl - 1H - cycloprop[c]isoquinoline acetate.

EXAMPLE 4

4-chlorostyrene (48.5 g.) and 70.0 g. of ethyl diazoacetate are mixed carefully at 0° C. The mixture is gradually heated to 160° C. and the exothermic reaction is maintained at this temperature by alternate heating and cooling as required. After the initial exothermic reaction is completed the mixture is held at 160° C. for four hours. The mixture is distilled under reduced pressure and the fraction, B.P. 126–165° C. at 1–2 mm., is collected. The above fraction is redistilled through a 12″ Vigreaux column to give a fraction, B.P. 121–6° C. at 0.8 mm. which is predominately cis-ethyl 2-(4-chlorophenyl)cyclopropanecarboxylate.

To 7.6 g. of cis-ethyl 2-(4-chlorophenyl)cyclopropanecarboxylate is added a solution of 5.7 g. of potassium hydroxide in 5.7 ml. of water and 25 ml. of 95% ethanol. The resulting solution is refluxed for four hours and then concentrated in vacuo. The residue is dissolved in 40 ml. of water and the solution adjusted to pH 1 with 10% hydrochloric acid solution. The crystalline precipitate is recrystallized from boiling water to give cis-2-(4-chlorophenyl)cyclopropanecarboxylic acid.

A mixture of 54.5 g. of cis-2-(4-chlorophenyl)cyclopropanecarboxylic acid and 75 ml. of thionyl chloride is allowed to stand at room temperature for 20 hours. Excess thionyl chloride is removed in vacuo, the last traces being stripped with benzene. The residue is distilled under reduced pressure to give cis-2-(4-chlorophenyl)cyclopropanecarbonyl chloride.

Technical sodium azide (22.5 g.) is covered with 75 ml. of dry toluene and the mixture is heated gradually while a solution of 18.0 g. of cis-2-(4-chlorophenyl)cyclopropanecarbonyl chloride in 75 ml. of dry toluene is added slowly over a period of 15 minutes. The mixture is refluxed for three hours, cooled, and the precipitated salts are filtered. The filtrate is evaporated in vacuo to leave the isocyanate as a red oil. The isocyanate (15.0 g.) is heated with 50 ml. of concentrated hydrochloric acid to give cis-2 - (4 - chlorophenyl)cyclopropylamine. Refluxing 12.0 g. of cis-2-(4-chlorophenyl)cyclopropylamine with an excess of ethyl formate for 17 hours, then removing the excess ethyl formate in vacuo gives, as the residue, cis-N-[2-(4-chlorophenyl)cyclopropyl]formamide.

By the procedure of Example 1 using cis - N - [2 - (4-chlorophenyl)cyclopropyl]formamide in place of cis-N-(2-phenylcyclopropyl)formamide, the product is 5-chloro-1a,7b-dihydro-1H-cycloprop[c]isoquinoline.

An ether solution of 5-chloro-1a,7b-dihydro-1H-cycloprop[c]isoquinoline is treated with maleic acid to give, after filtering, 5 - chloro-1a,7b-dihydro-1H-cycloprop[c]isoquinoline maleate.

EXAMPLE 5

By the procedure of Example 4 using, in place of 4-chlorostyrene, the following:

4-fluorostyrene
4-bromostyrene
2-methoxystyrene 2,5-dichlorostyrene
3,4-dichlorostyrene
2,4-dimethoxystyrene the products are, respectively:

5-fluoro-1a,7b-dihydro-1H-cycloprop[c]isoquinoline
5-bromo-1a,7b-dihydro-1H-cycloprop[c]isoquinoline
1a,7b-dihydro-7-methoxy-1H-cycloprop[c]isoquinoline
4,7-dichloro-1a,7b-dihydro-1H-cycloprop[c]isoquinoline
5,6-dichloro-1a,7b-dihydro-1H-cycloprop[c]isoquinoline
1a,7b-dihydro-5,7-dimethoxy-1H-cycloprop[c]-isoquinoline.

EXAMPLE 6

By the procedure of Example 3, using in place of 4-trifluoromethylstyrene the following:

3-methylstyrene
2,4-dimethylstyrene
4-butylstyrene
4-ethylstyrene
2,5-diethylstyrene the products are, respectively:

1a,7b-dihydro-4(and 6)-methyl-1H-cycloprop[c]-isoquinone
1a,7b-dihydro-5,7-dimethyl-1H-cycloprop[c]-isoquinoline
5-butyl-1a,7b-dihydro-1H-cycloprop[c]isoquinoline
5-ethyl-1a,7b-dihydro-1H-cycloprop[c]isoquinoline
4,7-diethyl-1a,7b-dihydro-1H-cycloprop[c]isoquinoline.

EXAMPLE 7

A mixture of 7 g. of cis-N-[2-(3,4-methylenedioxyphenyl)cyclopropyl]formamide (prepared from 3,4-methylenedioxystyrene by the procedure of Example 3) and 15 g. of phosphorus pentoxide in 100 ml. of tetrachloroethane is heated, under nitrogen, on a steam bath for four hours with stirring. Working up as in Example 1 gives 1a,7b-dihydro - 5,6 - methylenedioxy-1H-cycloprop-[c]isoquinoline.

EXAMPLE 8

By the procedure of Example 2, the following 1a,7b-dihydro-1H-cycloprop[c]isoquinoline hydrochlorides (prepared from the bases, which are obtained as described in the examples hereinabove, by dissolving the bases in ether, bubbling hydrogen chloride into the ether solution until the solution is acidic, heating for two minutes on a steam bath, then cooling and filtering):

5-chloro-1a,7b-dihydro-1H-cycloprop[c]isoquinoline hydrochloride
5-fluoro-1a,7b-dihydro-1H-cycloprop[c]isoquinoline hydrochloride
5-bromo-1a,7b-dihydro-1H-cycloprop[c]isoquinoline hydrochloride
1a,7b-dihydro-7-methoxy-1H-cycloprop[c]isoquinoline hydrochloride
4,7-dichloro-1a,7b-dihydro-1H-cycloprop[c]isoquinoline hydrochloride
5,6-dichloro-1a,7b-dihydro-1H-cycloprop[c]isoquinoline hydrochloride
1a,7b-dihydro-5,7-dimethoxy-1H-cycloprop[c]-isoquinoline hydrochloride
1a,7b-dihydro-4(and 6)-methyl-1H-cycloprop[c]-isoquinoline hydrochloride
1a,7b-dihydro-5,7-dimethyl-1H-cycloprop[c]isoquinoline hydrochloride
5-butyl-1a,7b-dihydro-1H-cycloprop[c]isoquinoline hydrochloride
5-ethyl-1a,7b-dihydro-1H-cycloprop[c]isoquinoline hydrochloride
4,7-diethyl-1a,7b-dihydro-1H-cycloprop[c]isoquinoline hydrochloride
1a,7b-dihydro-5,6-methylenedioxy-1H-cycloprop[c]-isoquinoline hydrochloride are reduced with sodium borohydride and the reaction mixture is worked up as described in Example 2 to give the following products, respectively:

5-chloro-1a,2,3,7b-tetrahydro-1H-cycloprop[c]-isoquinoline
5-fluoro-1a,2,3,7b-tetrahydro-1H-cycloprop[c]isoquinoline
5-bromo-1a,2,3,7b-tetrahydro-1H-cycloprop[c]-isoquinoline
1a,2,3,7b-tetrahydro-7-methoxy-1H-cycloprop[c]-isoquinoline
4,7-dichloro-1a,2,3,7b-tetrahydro-1H-cycloprop[c]-isoquinoline
5,6-dichloro-1a,2,3,7b-tetrahydro-1H-cycloprop[c]-isoquinoline
1a,2,3,7b-tetrahydro-5,7-dimethoxy-1H-cycloprop[c]-isoquinoline
1a,2,3,7b-tetrahydro-4(and 6)-methyl-1H-cycloprop[c]-isoquinoline
1a,2,3,7b-tetrahydro - 5,6 - dimethyl-1H-cycloprop[c]-isoquinoline
5 - butyl-1a,2,3,7b-tetrahydro-1H-cycloprop[c]-isoquinoline
5 - ethyl-1a,2,3,7b-tetrahydro-1H-cycloprop[c]-isoquinoline
4,7 - diethyl - 1a,2,3,7b-tetrahydro-1H-cycloprop[c]-isoquinoline
1a,2,3,7b - tetrahydro - 5,6-methylenedioxy-1H-cycloprop[c]isoquinoline.

EXAMPLE 9

Cis-2-phenylcyclobutylamine (10 g.) is heated at reflux with 100 ml. of ethyl formate for 10 hours. Removing the excess ethyl formate in vacuo gives, as the residue, cis-N-(2-phenylcyclobutyl)formamide.

Seven grams of the above prepared formamide is heated with 20 g. of phosphorus pentoxide in 100 ml. of tetrachloroethane at 100° C. for three hours with stirring. Working up as in Example 1 gives 1,2,2a,8b-tetrahydrocyclobut[c]isoquinoline.

Similarly, using cis-2-phenylcyclopentylamine in the above procedure the product is 2,3,3a,9b-tetrahydro-1H-cyclopent[c]isoquinoline.

Reducing the above prepared products with sodium borohydride by the procedure of Example 2, gives 1,2,2a,3,4,8b-hexahydrocyclobut[c]isoquinoline and 2,3,3a,4,5,9b-hexahydro-1H-cyclopent[c]isoquinoline, respectively.

Treating an ether solution of 2,3,3a,4,5,9b-hexahydro-1H-cyclopent[c]isoquinoline with hydrogen bromide, then filtering gives 2,3,3a,4,5,9b-hexahydro-1H-cyclopent[c]-isoquinoline hydrobromide.

EXAMPLE 10

A mixture of 18.2 g. of 1a,2,3,7b-tetrahydro-1H-cycloprop[c]isoquinoline hydrochloride (prepared as in Example 2), 18.4 g. of 98% formic acid and 10.5 g. of 37% formaldehyde is stirred and heated at reflux for five hours. After cooling, 5 ml. of 12 N hydrochloric acid is added and the solution is concentrated in vacuo. The residue is made alkaline with 10 N sodium hydroxide solution and then extracted with ether. The ether extract is dried over magnesium sulfate, filtered and the ether is removed in vacuo from the filtrate to give 1a,2,3,7b-tetrahydro-2-methyl-1H-cycloprop[c]-isoquinoline.

Similarly, using in the above procedure 19.6 g. of 1,2,2a,3,4,8b - hexahydrocyclobut[c]isoquinoline hydrochloride and 21.0 g. of 2,3,3a,4,5,9b-hexahydro-1H-cyclopent[c]isoquinoline hydrochoride (each of these hydrochloride salts is prepared from the respective bases by the procedure of Example 1), the products are, respectively, 1,2,2a,3,4,8b - hexahydro-3-methylcyclobut[c]isoquinoline and 2,3,3a,4,5,9b-hexahydro-4-methyl-1H-cyclopent[c]isoquinoline.

EXAMPLE 11

To a rapidly stirred suspension of 14.5 g. of 1a,2,3,7b-tetrahydro-1H-cycloprop[c]isoquinoline in 20 cc. of water is added 21.4 g. of 95% acetic anhydride. After stirring for one hour, the mixture is kept at 5–7° C. for 12 hours and then extracted with chloroform. The extract is washed with aqueous sodium bicarbonate, then dried over magnesium sulfate. The chloroform is removed in vacuo and the residue is dissolved in 60 ml. of dry tetrahydrofuran. To this solution is added 4.5 g. of lithium aluminum hydride in portions with stirring. The resulting mixture is stirred at 50° C. for two hours, then cooled and treated cautiously with 9 ml. of water. The mixture is filtered using a diatomaceous earth filter and the filtrate diluted with 100 ml. of water and then extracted with ether. The ether extract is dried over magnesium sulfate, then filtered. Removal of the ether from the filtrate gives 2-ethyl-1a,2,3,7b-tetrahydro-1H-cycloprop[c]isoquinoline.

Similarly, using 31.6 g. of n-butyric anhydride in the above procedure, the product is 2-(n-butyl)-1a,2,3,7b-tetrahydro-1H-cycloprop[c]isoquinoline.

What is claimed is:
1. A compound selected from the following formulas:

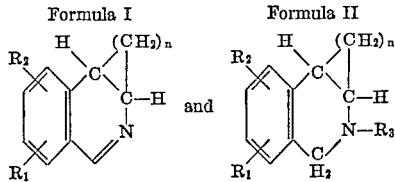

Formula I    and    Formula II in which:

$R_1$ is hydrogen, halogen, lower alkyl, lower alkoxy or trifluoromethyl;

$R_2$ is hydrogen or, together with $R_1$, methylenedioxy, dihalogen, di-lower alkyl or di-lower alkoxy;

$R_3$ is hydrogen or lower alkyl and $n$ is an integer of from 1 to 3 inclusive or pharmaceutically acceptable, acid addition salts thereof.

2. A compound according to Formula I of claim 1 in which $R_1$ and $R_2$ are hydrogen and $n$ is 1, said compound being 1a,7b-dihydro-1H-cycloprop[c]isoquinoline.

3. A compound according to Formula I of claim 1 in which $R_1$ and $R_2$ are hydrogen and $n$ is 1 as the hydrochloride salt, said compound being 1a,7b-dihydro-1H-cycloprop[c]isoquinoline hydrochloride.

4. A compound according to Formula II of claim 1 in which $R_1$, $R_2$ and $R_3$ are hydrogen and $n$ is 1, said compound being 1a,2,3,7b-tetrahydro-1H-cycloprop[c]isoquinoline.

5. A compound according to Formula II of claim 1 in which $R_1$, $R_2$ and $R_3$ are hydrogen and $n$ is 1 as the hydrochloride salt, said compound being 1a,2,3,7b-tetrahydro-1H-cycloprop[c]isoquinoline hydrochloride.

References Cited

UNITED STATES PATENTS 3,141,888    7/1964    Loeu _____ 260—289

ALEX MAZEL, *Primary Examiner.*

D. A. DAUS, *Assistant Examiner.*

U.S. Cl. X.R.

260—283, 289, 256, 562, 468, 476, 515, 650, 612, 669, 999